Patented July 24, 1934

1,967,311

UNITED STATES PATENT OFFICE 1,967,311

CERAMIC PRODUCT AND THE MANUFACTURE THEREOF

Ludwig Kern, Webster Groves, Mo.

No Drawing. Application June 18, 1930,
Serial No. 462,127

12 Claims. (Cl. 25—156)

This invention relates to the manufacture of brick, tile, and like ceramic materials, and with regard to certain more specific features, to the manufacture of ceramic materials of the types set forth utilizing ashes as a principal constituent.

Among the several objects of the invention may be noted the provision of a process wherein a valuable product is manufactured from commonly wasted ashes, such as coal ashes and the like; a process of the class described which is adapted to the production of a wide variety of ceramic products; a process for the utilization, more specifically, of the fine ashes produced in the modern technology of burning powdered or pulverized coal, wherein valuable products are manufactured; and the provision of a process wherein the raw materials can be widely varied to yield products of varying characteristics. Other objects will be in part obvious and in part pointed out hereinafter.

The invention accordingly comprises the elements and combinations of elements, steps and sequence of steps and features of synthesis which will be exemplified in the description hereinafter and the scope of the application of which will be indicated in the following claims.

Attendant upon the modern practice of burning powdered or pulverized coal in power plants or the like is the production of large quantities of fine, powdery ashes. Heretofore the disposal of such ashes has been considered a problem, inasmuch as their low weight and extremely fine state of subdivision has rendered ordinary methods of disposal, as through piling or burying, impracticable. As a result, great quantities of powdered ashes have been dumped into streams and rivers, thereby polluting the water and tending to deposit and obstruct navigable streams, and still greater quantities have been blown out through chimneys together with flue gases, thereby increasing smoke production and polluting the atmosphere, and occasioning objectionable settling over the surrounding countryside.

I have discovered that these powdered ashes, when mixed with suitable binder materials, can be economically manufactured into ceramic products such as building or refractory brick, tiles, terra cotta, and the like. The character of the resultant product depends largely upon the characters of the ash. Chemical analyses show that coal ashes have similar composition to naturally-occurring clays, including quantities of aluminum. The fusion point of the ash varies from 1200° C. to 1700° C., according to the amount of fluxing material present. The quantity of fluxing material can be artificially regulated by addition or removal to produce a product of the proper fusion or vitrification point.

In carrying out the invention, powdered ashes as described are plasticized with appropriate liquids, which may comprise water alone, acid solutions, alkaline solutions, or chloride solutions. With the ash may be incorporated suitable quantities of argillaceous materials, such as plastic clays, fire clays, shales or the like, dolomites, limestones, or carbonaceous substances such as coal. These incorporated substances serve, in some instances, as structural binders during and after the firing, and in other instances, for example, as fluxes for controlling the fusion point of the mixture. The bituminous matter added is subsequently burned out in the firing of the product.

After the plastic mass is prepared, it is molded in the customary manner and fired. The particular method of molding and firing is of no consequence.

The following are two specific examples of the process:

Example I

The pulverized coal ash, preferably fine enough to pass through a 100 mesh screen, is plasticized in a pug mill or wet pan with water or acid, alkaline or chloride solutions, and ground. After the mass has become suitably plastic, it is removed and molded, dried and fired.

Example II

Equal parts of fine coal ash and pulverized fire clay are intimately mixed and wetted with water. The mixture is then plasticized by homogenizing or grinding in a pug mill or wet pan. After the mass has become suitably plastic, it is removed and molded, dried and fired.

I have found acids or chlorides to be the most suitable plasticizing liquids where the alkaline-earth content of the ash is high. Water alone is generally suitable, but especially so in the case of ashes containing large amounts of alumina. Alkaline solutions are desirable for high silica-content ashes. However, it is to be understood that the plasticizing agents mentioned are interchangeable with good results, and are not restricted in use to the specific composition mentioned.

The product is hard, dense, has little shrinkage, and according to the composition of the mix, withstands high or low temperatures as the case may be. As exemplary of the product, bricks made from the ashes of powdered Illinois soft coal and Missouri fire clay, plasticized with water and molded and burned in the customary manner, are hard, dense, high-temperature-resisting, and weatherproof, and have an attractive color of light gray.

The bricks which contain, prior to firing, carbonaceous material, or shale-containing carbonaceous materials, have such carbonaceous materials burned out during the firing, and the brick is consequently rendered lighter and more porous, and suitable for insulating purposes and the like.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The process of manufacturing ceramic products which comprises mixing powdered coal ashes and argillaceous material, plasticizing the mixture with a chloride and grinding, molding the plastic mass so formed, and firing the molded mass.

2. The ceramic product comprising a burned mixture of shales and powdered ashes, one of said shales being initially of a carboniferous nature.

3. The ceramic product comprising a burned mixture of bituminous- and carbonaceous-material-containing shales, and powdered ashes.

4. The process of manufacturing ceramic products which comprises mixing powdered ashes and bituminous- and carbonaceous-material-containing shales, molding the mixture, and burning the molded mixture so that said carbonaceous and bituminous materials are consumed, to an extent sufficient to produce a porous product.

5. The ceramic product comprising a burned cellular mixture of argillaceous material, a combustible substance, and ashes resulting from the burning of finely divided fuel, the mixture containing a lesser proportion of argillaceous material than of ashes.

6. The cellular ceramic product comprising a burned mixture of argillaceous material and powdered fuel ashes, the ashes constituting the greater part of the product and the argillaceous material comprising ten to thirty percent of the product.

7. The ceramic product comprising a burned mixture including, prior to burning, ten to twenty-five percent of argillaceous material, a small quantity of combustible material, and the remainder consisting substantially of powdered coal ashes.

8. The ceramic product comprising a burned mixture of a carbonaceous material, plastic clay and powdered ashes.

9. The process of manufacturing ceramic products which comprises intimately mixing powdered ashes and an argillaceous material having a combustible ingredient, molding the mixture, and firing the molded mixture to remove the combustible ingredient by burning.

10. The process of manufacturing brick which comprises forming a mixture consisting in greater part of powdered coal ashes together with a mixed binder of argillaceous material and an alkaline earth material, and subsequently molding and firing the mixture.

11. The process of manufacturing brick which comprises forming a mixture of at least fifty percent of powdered coal ashes, together with sand and plastic clay, and subsequently molding and firing the mixture.

12. The process of manufacturing ceramic products which consists in burning a finely divided coal, in recovering and intimately mixing the ash therefrom with an argillaceous material, and in shaping the mixture and firing the same.

LUDWIG KERN.